(No Model.)
A. G. DEHLIN & B. C. CLARK.
TRACK ATTACHMENT FOR BICYCLES.
No. 575,337.   Patented Jan. 19, 1897.
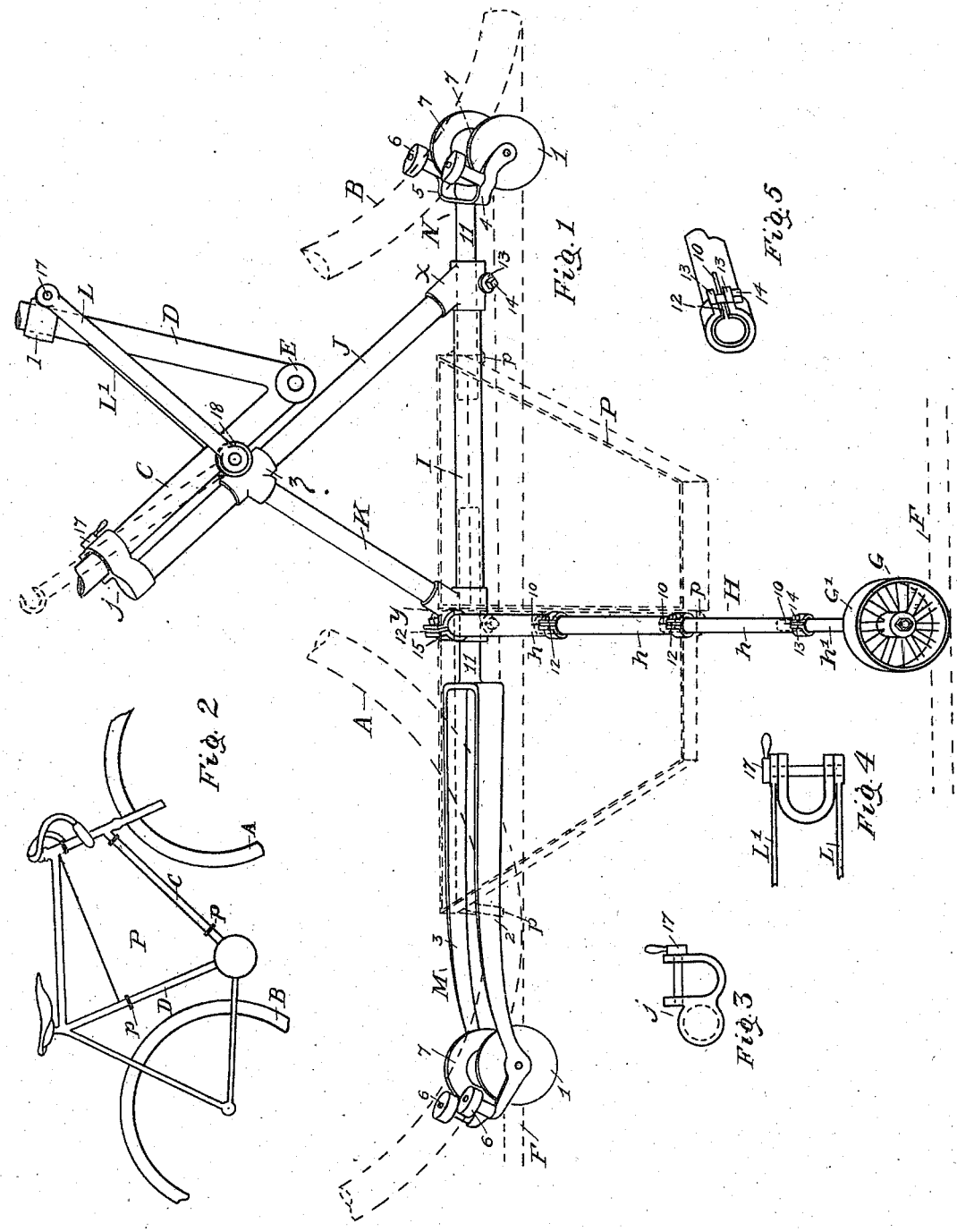
Witnesses
Samuel G. Dunlap.
Clarence L. White.
Inventors
August G. Dehlin.
Benjaman C. Clark.
by Frank E. Adams
Attorney

UNITED STATES PATENT OFFICE.

AUGUST G. DEHLIN AND BENJAMAN C. CLARK, OF SEATTLE, WASHINGTON.

TRACK ATTACHMENT FOR BICYCLES.

SPECIFICATION forming part of Letters Patent No. 575,337, dated January 19, 1897.

Application filed September 10, 1896. Serial No. 605,378. (No model.)

*To all whom it may concern:*

Be it known that we, AUGUST G. DEHLIN and BENJAMAN C. CLARK, citizens of the United States, residing at Seattle, in the county of King and State of Washington, have invented a new and useful Track Attachment for Bicycles, of which the following is a specification.

Our invention relates to improvements in bicycle attachments adapted to steady and guide a two-wheeled vehicle upon a track composed of two rails running side by side; and the objects of our improvement are, first, to provide an adjustable attachment for steadying and guiding a bicycle upon one rail of any ordinary raised track; second, to provide such attachment with suitable means for guiding each wheel of the bicycle upon the rail, adapting it for great speed without fear of the wheels leaving the track; third, to provide adjustable features whereby the attachment may be quickly adapted to different gage tracks and styles of bicycles, and when detached may be separated in parts and the parts shut or closed together in compact form, and, fourth, to provide antifriction-guides adapted to control the direction of travel of the individual wheels upon the rail and to guide the bicycle thereupon without the necessity of constant contact of the guides with the rail and wheels and permitting of a guidance of the bicycle upon the rail from the handle-bar. We attain these objects by the mechanism illustrated in the accompanying drawings, in which—

Figure 1 is a perspective view of our track attachment when applied to a bicycle and parts of the bicycle necessary to indicate the connections and operation being shown and the wheels thereof contacting with the rail and both indicated by dotted lines; Fig. 2, a side elevation of an ordinary bicycle-frame, showing the box adapted to contain the track attachment when disjointed attached therein; Fig. 3, a detailed view of the cap-clamp; Fig. 4, a detailed view of the arm-clamp, and Fig. 5 a detailed view of the clamping device employed in fastening the several parts of the track attachment together.

Similar letters and figures refer to similar parts throughout the several views.

Referring to the drawings, A indicates the front and B the rear tire of the wheels of any ordinary bicycle, C the bottom line-tube, and D the seat-post tube, which are each attached to the bottom bracket E.

The tires A and B are indicated in Fig. 1 as resting upon the right-hand rail F of any ordinary raised track, being maintained in an upright position by the track attachment heretofore mentioned, which is pendent from the frame thereof, but has contact with the opposite rail by means of a steadier-wheel G, attached to the end of the adjustable arm H, comprising telescope joints $h$ and $h'$, adapted to slide upon each other in adjusting the arm to tracks of various gages or in disjointing the attachment for packing.

Comprising the main frame of the track attachment is the bottom line-tube I, attachment-tube J, brace-tube K, stays L and L', tube-brackets X $y$ $z$, and clamps $j$ and $l$.

In the bottom line-tube I is adjustably attached the forward extension M and rear extension N, each of which is adapted to provide support for a guide-wheel 1, journaled in furcations 2 and 3 of the former and 4 and 5 of the latter, having flanges faced with rubber rings 7 to avoid noise and adapted to fit loosely the tread of the rail, but held from contact therewith and from the tires A and B by the suspension of the main frame from the line-tube C and post-tube D. Each of the furcations 2, 3, 4, and 5 also support the journal of a guide-roller 6, placed forward of the guide-wheel 1 on each extension, oppositely arranged over the flanges and of sufficient diameter to permit contact with the tires A and B should the wheels of the bicycle turn from alinement sufficiently to endanger the tire leaving the rail, but permitting the use of the handle-bar in steering the forward wheel without contact of the guide-rollers with the tire when the wheel is guided centrally with reference to the tread of the rail, and when so guided the flanges of the guide-wheels 1 remain from contact with the sides of the tread of the rail, but immediately either wheel turns to any extent from alinement the guide-roller 6 on the verging side engages the tire and the rubber face of the opposite flange of the guide-wheel 1 comes in contact with the side of the rail and the bicycle is securely held in line upon the rail. Thus fast riding may be indulged in with a feeling of perfect safety, and though the tread of the rail may be slippery, by reason of moisture or grease, the tires of the bicycle-wheels are checked from slipping from the track.

The furcations 2 and 3 of the forward extension M are extended to permit the tire A of the forward wheel of any ordinary bicycle to operate therebetween and the guide-wheel 1 and guide-rollers 6 to be mounted forward of the point of contact of the periphery of the tire with the tread of the rail, while the furcations of the rear extension are shorter, merely providing for the mounting of the guide wheel and rollers thereupon forward of the rear tire B and a space for the operation of the tire.

Each end of the bottom line-tube I is provided with longitudinal slots 10, as indicated in Fig. 5, and the brackets $x$ and $y$ are adapted to clamp the tube I securely about the shanks 11 of the extensions M and N by means of a parting 12, ears 13, oppositely arranged along said parting, and a clamping-screw 14, passing through one of said ears across the parting and threaded in the opposite ear. Thus the extensions M and N may be slipped in and out and fastened in the bottom line-tube I, adapting the attachment for different sizes and styles of bicycles. The forward bracket $y$ is also provided with an upper clamp 15, placed transversely the machine to receive and fasten the arm H in place. At the outer end of each joint $h$ of the arm H is provided a clamp similar to that shown in Fig. 5, and each joint is slotted to permit of a clamping of the several parts together, the outer joint $h'$ being adapted to provide a journal for the steadier-wheel G, which is provided with a flat rubber tire G' and has ball-bearings. This arm H may project from either side of the attachment and the steadier-wheel G operate upon the right or left rail, according to the position of the bicycle.

By an adjustment of the clamps on the joints $h$ the arm H may be closed together or telescoped and may be adjusted to tracks of various gages.

In attaching our device to any ordinary bicycle the clamping-screws 17 of the clamps $l$ and $j$ are withdrawn and the stay L' thrown forward to the position indicated in dotted lines in Fig. 1, when the line-tube C is placed between the ears 18 of bracket $z$ and in the clamp $j$ and the clamp $l$ is placed about the post-tube D and the clamping-screws 17 inserted in place. The stay L' is then replaced and the attachment raised to the requisite position to avoid contact of the hubs of the guide-wheels 1 with either the tires of the bicycle-wheels or the tread of the track, and the clamps $l$ and $j$ are fastened securely in place by the screws 17. The forks M and N and the arm H may then be adjusted, as heretofore explained.

The guide-wheels 1 and guide-rollers 6 may be provided with either ball or roller bearings.

It will be clearly seen that when the track attachment is in position, as above explained, a skilful rider may steer the bicycle upon the rail without causing friction by reason of contact of the roller 6 with the tires or the wheels 1 with the rail. Thus a safe guide is provided for the bicycle without necessitating a constant operation of either of the guides, the only additional friction being caused by the steadier-wheel G operating on the opposite rail of the track from the bicycle.

The diameter of the tube composing the tire on ordinary bicycle-wheels being less than the width of the tread of an ordinary rail, the face of the hub between the flanges of the guide-wheel 1 is greater than the distance between the peripheries of the guide-rollers 6, though the proportion may be varied in construction to suit the intent of the manufacturer.

We have provided for the bracing of our track attachment a bracket P, in box form, adapted to shut together on hinges when detached from the attachment and to contain the several parts thereof when disjointed, and provided with straps $p$ for fastening in the frame of the bicycle, as indicated in Fig. 2, and for securing to the bar H guide-fork M, and line-tube I. This box-bracket P is made in any desirable form adapting it when closed to contain the several parts of the track attachment and to fit within the frame of the bicycle, and when open formed with a shoulder to rest against the telescope arm H and brace same when resting thereupon and fastened thereto. This is accomplished by dividing the box in two parts of unequal thickness and hinging same together on one side at the parting-line.

The guide-rollers 6 are so placed that the longitudinal center line of the journals thereof may be as nearly radial with the center of the wheels of the average style of bicycles as practicable considering the varying proportions of the different styles of machines with which the track attachment may be used, thus providing for the least amount of friction possible when the peripheries of the rollers 6 come in contact with the sides of the tire A or B.

We do not limit ourselves to the exact construction illustrated in the accompanying drawings, as various forms for the main frame of the attachment might be adopted or the method of attachment varied without altering the essential feature of our attachment, which comprises, in part, the means adopted for guiding the wheels in alinement and the bicycle upon the rail, while permitting of the steering of the vehicle by the handle-bars, avoiding contact of the guide-rollers with the tires of the wheels or the flanges of the guide-wheels with the head of the rail.

We are aware that prior to our invention numerous devices have been attached to bicycles for their operation upon a rail. We therefore do not claim such a device, broadly; but What we do claim, and desire to secure by Letters Patent, is—

1. A track attachment for bicycles, comprising a pendent main frame, forward and rear extensions, bifurcated, and longitudinally adjustable therein, guide-wheels, transversely journaled between said furcations with flanges projecting below the tires of the bicycle-wheels, guide-rollers on each of said furcations projecting diametrically inward over said flanges and an adjustable side arm attached in said frame and carrying a steadier-wheel at its outer end, substantially as shown and described.

2. In track attachments for bicycles, the combination with the main frame thereof, adapted for suspension from the frame of a bicycle, of the forward and rear extensions adjustable in said frame, having bifurcations with flanged guide-wheels, journaled therebetween, adapted for contact with a rail of said track and guide-rollers projecting diametrically over said flanges, adapted for contact with the tires on the wheels of said bicycle, substantially as shown and described.

3. In track attachments for bicycles, the guides thereof, comprising a guide-wheel, flanged at each end, and a guide-roller over each of said flanges projecting diametrically inward, said wheel adapted to fit loosely over the tread of the track and said rollers at opposite sides of the tire of the bicycle-wheel, when said attachment is pendent from the bicycle-frame over said track, substantially as shown and described.

4. In track attachments for bicycles, the combination with the bicycle-wheel, of the guide-rollers journaled with the peripheries thereof, diametrically opposite, with reference to the tire, a flanged guide-wheel under said rollers, with the flange thereof projecting below said tire, said rollers adapted to engage the side of said tire, when the wheel shifts from alinement and said flanges adapted to contact with the track, when the bicycle leads from the center of the tread of the rail, substantially as shown and described.

5. In track attachments for bicycles, the combination with guides thereon, adapted to guide the bicycle upon a rail, and with the wheels of said bicycle; of the guide-rollers journaled, diametrically opposite with reference to the tire of said wheel and adapted to engage the side of the tire when turned from alinement, substantially as shown and described.

6. In track attachments for bicycles having a main frame, forward and rear bifurcated extensions and a side arm, the combination of the guides on said extensions adapted to guide the bicycle-wheels on one rail, and comprising a flanged wheel journaled between said bifurcations and guide-rollers journaled thereon and projecting diametrically inward over said flanges, with a steadier-wheel journaled at the end of said arm adapted for contact with the opposite rail, substantially as shown and described.

AUGUST G. DEHLIN.
BENJAMAN C. CLARK.

Witnesses:
OWEN A. HARRIS,
E. G. SANDERS.